(12) United States Patent
Park et al.

(10) Patent No.: US 11,489,209 B2
(45) Date of Patent: Nov. 1, 2022

(54) METHOD FOR IMPROVING LIFE PROPERTIES AND CHARGING SPEED OF LITHIUM-SULFUR SECONDARY BATTERY

(71) Applicant: LG CHEM, LTD., Seoul (KR)

(72) Inventors: Intae Park, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 261 days.

(21) Appl. No.: 16/636,538

(22) PCT Filed: Aug. 10, 2018

(86) PCT No.: PCT/KR2018/009175
§ 371 (c)(1),
(2) Date: Feb. 4, 2020

(87) PCT Pub. No.: WO2019/045312
PCT Pub. Date: Mar. 7, 2019

(65) Prior Publication Data
US 2021/0184274 A1    Jun. 17, 2021

(30) Foreign Application Priority Data
Sep. 1, 2017 (KR) .................... 10-2017-0111828

(51) Int. Cl.
*H02J 7/00* (2006.01)
*H02M 3/158* (2006.01)
*H01M 10/44* (2006.01)

(52) U.S. Cl.
CPC ........ *H01M 10/44* (2013.01); *H02J 7/00714* (2020.01)

(58) Field of Classification Search
CPC ... H01M 4/5815; H01M 10/44; H02J 7/00714
See application file for complete search history.

(56) References Cited

U.S. PATENT DOCUMENTS 6,329,789 B1 * 12/2001 Gavrilov ............... H01M 10/44
320/125
6,377,030 B1    4/2002 Asao et al.
(Continued)

FOREIGN PATENT DOCUMENTS

| CN | 1435002 A | 8/2003 |
| CN | 106159361 A | 11/2016 |

(Continued)

OTHER PUBLICATIONS

Jin Dae Gun, Translation of KR-20130045974-A, May 2013 (Year: 2013).*

(Continued)

*Primary Examiner* — Drew A Dunn
*Assistant Examiner* — Pamela J Jeppson
(74) *Attorney, Agent, or Firm* — Birch, Stewart, Kolasch & Birch, LLP

(57) ABSTRACT

A method for improving a lifetime property and a charging rate of a lithium-sulfur secondary battery capable of both improving a lifetime property and a charging rate of the secondary battery by inducing a homogeneous reaction of the lithium-sulfur secondary battery by applying a charging rate differently for each section in a charging process of the lithium-sulfur secondary battery.

8 Claims, 3 Drawing Sheets

(56) References Cited

U.S. PATENT DOCUMENTS

| | | | | |
|---|---|---|---|---|
| 2005/0242777 A1* | 11/2005 | Van Beek et al. | ...... | B60L 58/13 320/128 |
| 2005/0264263 A1* | 12/2005 | Tsenter | ................ | H02J 7/0072 320/128 |
| 2007/0166617 A1* | 7/2007 | Gozdz | .................. | H01M 4/136 429/231.95 |
| 2017/0244255 A1 | 8/2017 | Luo et al. | | |

FOREIGN PATENT DOCUMENTS

| | | |
|---|---|---|
| CN | 106654425 A | 5/2017 |
| JP | 2003-518713 A | 6/2003 |
| JP | 2003-223936 A | 8/2003 |
| JP | 2006-351489 A | 12/2006 |
| JP | 4801304 B2 | 10/2011 |
| JP | 10-2013-0045974 A | 5/2013 |
| KR | 10-2000-0012125 A | 2/2000 |
| KR | 10-2002-0077365 A | 10/2002 |
| KR | 10-0396490 B1 | 9/2003 |
| KR | 10-0471971 B1 | 3/2005 |
| KR | 10-0550981 B1 | 2/2006 |
| KR | 20130045974 A * | 5/2013 ............ H01M 10/44 |
| KR | 10-2017-0099378 A | 8/2017 |
| WO | WO 01/47088 A2 | 6/2001 |

OTHER PUBLICATIONS

Ciochan et al., Core-double shell sulfur@carbon black nanospher@oxidized carbon nanosheet composites as the cathode materials for Li—S batteries, Mar. 31, 2017, Electrochimica Acta, 237, 78-86 (Year: 2017).*

Fan et al., "Mechanism and Kinetics of $Li_2S$ Precipitation in Lithium-Sulfur Batteries", Advanced Materials, vol. 27, 2015, pp. 5203-5209.

Gerber et al., "3-Dimensional Growth of Li2S in Lithium-Sulfur Batteries Promoted by a Redox Mediator", Nano Letters, vol. 16, No. 1, pp. 549-554 (pp. 1-28).

International Search Report issued in PCT/KR2018/009175 (PCT/ISA/210), dated Nov. 19, 2018.

Noh et al., "A new insight on capacity fading of lithium-sulfur batteries: The effect of $Li_2S$ phase structure", Journal of Power Sources, vol. 293, 2015, pp. 329-335.

Extended European Search Report for European Application No. 18851559.7, dated Jul. 27, 2020.

\* cited by examiner (A)

(B)

(A)

(B)

(C)

(D)

(E)

(F)

(A)

(B)

METHOD FOR IMPROVING LIFE PROPERTIES AND CHARGING SPEED OF LITHIUM-SULFUR SECONDARY BATTERY

TECHNICAL FIELD

This application claims the benefit of priority based on Korean Patent Application No. 10-2017-0111828, filed Sep. 1, 2017, and all the contents disclosed in the literatures of the corresponding Korea patent applications are included as a part of the present specification.

The present invention relates to a lithium-sulfur secondary battery, and in particular, to a method for improving a lifetime property and a charging rate of a lithium-sulfur secondary battery capable of improving both a lifetime property and a charging rate of the secondary battery by inducing a homogeneous reaction of the lithium-sulfur secondary battery.

BACKGROUND ART

In secondary batteries of which application fields expand to electric vehicles, energy storage systems or the like, lithium-sulfur secondary batteries particularly have received attention as a next generation secondary battery technology with capability of obtaining relatively high energy storage density and the like. Such a lithium-sulfur secondary battery means a battery which uses a sulfur series material having a sulfur-sulfur bond (S—S bond) as a positive electrode active material and a lithium metal as a negative electrode active material. Particularly, sulfur used as a main material of the positive electrode active material has an advantage of being very abundant in resources, having no toxicity, and having a low atomic weight.

In the lithium-sulfur secondary battery, lithium, the negative electrode active material, is oxidized by being ionized while emitting electrons when discharged, and a sulfur series material, the positive electrode active material, is reduced by receiving the emitted electrons (an oxidation reaction of lithium is a process in which lithium metal is converted to a lithium cation form by releasing electrons, and a reduction reaction of sulfur is a process in which an S—S bond is converted to a sulfur anion form by accepting two electrons). Herein, the lithium cation produced by the oxidation reaction of the lithium is transferred to a positive electrode through an electrolyte, and forms a salt by bonding with the sulfur anion produced by the reduction reaction of the sulfur. More specifically, the sulfur has a cyclic $S_8$ structure before discharge, and is converted to lithium polysulfide (LiPS) by the reduction reaction, and when the lithium polysulfide is completely reduced, lithium sulfide ($Li_2S$) is produced.

DISCLOSURE

Technical Problem

As examined above, lithium-sulfur (Li—S) secondary batteries have received much attention due to their many advantages. However, existing lithium-sulfur secondary batteries have a problem of a capacity retention rate being reduced due to active material loss caused by lithium polysulfide (LiPS) elution. In addition, a concentration of lithium polysulfide (LiPS) in an electrolyte liquid rapidly increases in a lithium-sulfur secondary battery having high energy density, and herein, sulfur reactivity decreases by decreasing electrolyte liquid mobility, which leads to a problem of accelerating degeneration while the battery exhibits a heterogeneous reaction pattern.

In this regard, as ways to induce a homogeneous reaction of a lithium-sulfur secondary battery, attempts to design a sulfur positive electrode structure, or use a redox mediator as a positive electrode additive have been made. However, this has disadvantages in that a process of dispersing the sulfur positive electrode additive is complicated, and synthesize of the redox mediator is difficult.

As a more effective method to induce a homogeneous reaction of a lithium-sulfur secondary battery, attempts to adjust a discharging rate, or improve sulfur positive electrode reactivity through changing an electrolyte liquid composition using an additive have been progressed, however, this also has not been significantly effective so far.

Accordingly, an aspect of the present invention provides a method for improving a lifetime property and a charging rate of a lithium-sulfur secondary battery capable of enhancing both a lifetime property and a charging rate of the secondary battery by inducing a homogeneous reaction of a lithium-sulfur secondary battery through applying a charging rate differently for each step during a charging process of the lithium-sulfur secondary battery.

Technical Solution

According to an aspect of the present invention, there is provided a method for charging a lithium-sulfur secondary battery, the method including charging the lithium-sulfur secondary battery in a plurality of sections by applying a different charging rate for each section among the plurality of sections.

Advantageous Effects

According to a method for improving a lifetime property and a charging rate of a lithium-sulfur secondary battery according to the present invention, both a lifetime property and a charging rate of the secondary battery can be enhanced by inducing a homogeneous reaction of the lithium-sulfur secondary battery through applying a charging rate differently for each step during a charging process of the lithium-sulfur secondary battery.

BEST MODE

Hereinafter, the present invention will be described in detail.

A method for improving a lifetime property and a charging rate of a lithium-sulfur secondary battery according to the present invention comprises a step with applying a charging rate differently for each section in a charging process of the lithium-sulfur secondary battery.

The method for improving a lifetime property and a charging rate of a lithium-sulfur secondary battery according to the present invention uses existing materials such as common positive electrodes, negative electrodes, electrolyte liquids and separators in the same or a similar manner without using additional materials. However, a step of dividing a charging process into predetermined steps, and applying a charging rate differently between the steps in at least one or more of the steps is further included, and an effect of improving a charging rate as well as a lifetime property of the battery is identified therethrough.

Figure 1:
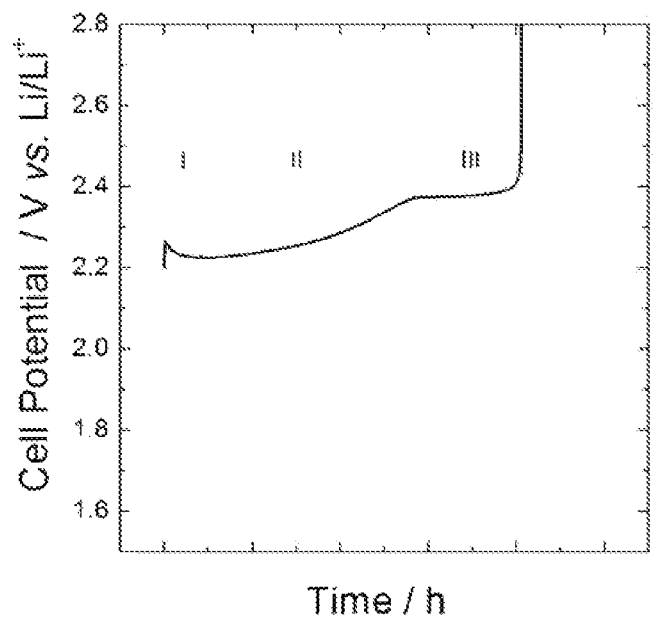
FIG. 1 is a mimetic diagram showing stepwise charge on a lithium-sulfur secondary battery according to one embodiment of the present invention.

In other words, the method for improving a lifetime property and a charging rate of a lithium-sulfur secondary battery according to the present invention uses a different charging rate variously for each section during a charging process, and the section may be divided into 2 or more steps with different charging rates, preferably 2 to 5 steps and more preferably 2 or 3 steps. If possible, minimizing the number of sections with different charging rates is most preferred. For example, the section may be divided into any one selected from the group consisting of 2 steps of high rate/low rate (high rate→plow rate), 2 steps of low rate/high rate (low rate→high rate), 3 steps of low rate/high rate/low rate (low rate→high rate→plow rate) and 3 steps of high rate/low rate/high rate (high rate→plow rate→high rate). FIG. 1 is a mimetic diagram showing stepwise charge on a lithium-sulfur secondary battery according to one embodiment of the present invention, and it is identified that, in FIG. 1, the charging process has 3 steps, and the charging rate was set differently for each section among a first section I, a second section II and a third section III.

In the setting of the charging section, the high rate and the low rate are relative, and are variables that do not require particular numerical limitation. For example, the charging rate in the high rate section I is set at 0.15 C to 0.25 C (current rate, charge and discharge rate) and preferably at approximately 0.2 C, and the charging rate in the low rate section III is set at 0.05 C to 0.1 C and preferably at approximately 0.1 C, and high and low of the charging rate need to be adjusted once or more during one charging process.

Meanwhile, when applying a charging rate differently for each section during a charging process of the lithium-sulfur secondary battery as above, lithium polysulfide diffusion is suppressed in the high rate section and an equalization reaction is obtained in the low rate section, and the present invention enhances or improves a lifetime property of the battery using such a principle. In other words, the present invention is highly meaningful since it is capable of obtaining a homogeneous reaction of a lithium-sulfur secondary battery when charging and thereby improving a battery lifetime property without adding a separate redox mediator or changing an electrolyte liquid composition using an additive.

When charging is progressed in the above-described manner, an overall average charging rate decreases compared to when charging is progressed at a high rate from beginning to end, and accordingly, time required for complete charge increases. However, as described in the background art, a problem such as battery degeneration occurs due to a heterogeneous reaction of a lithium-sulfur secondary battery when charging at the same rate from beginning to end, or a problem such as an excessive increase in time required for complete charge of a battery occurs when a low rate charge is maintained. Accordingly, the present invention improves a charging rate to the maximum as well as enhancing a battery lifetime property while resolving the above-mentioned problems. Meanwhile, a charging rate being improved in the present invention means a charging rate of the battery of the present invention being enhanced to the maximum under the condition for performing a homogeneous reaction so that the lithium-sulfur secondary battery does not degenerate.

Particularly, when setting the charging section to have 2 steps of high rate/low rate (high rate→low rate) in the present invention, high rate charge may be achieved to capacity corresponding to 70% to 80% of maximum battery capacity in just 80 minutes to 280 minutes, preferably 180 minutes to 240 minutes based on a 0.2 C rate while maintaining or enhancing a lifetime property. This is close to a very equal charging rate level of common charging systems maintaining a high rate from beginning to end (refer to the following Examples 4 to 6 and Comparative Example 2).

Meanwhile, a positive electrode of the lithium-sulfur secondary battery used in the present invention includes a positive electrode current collector and a positive electrode active layer formed on the positive electrode current collector. The positive electrode current collector is not particularly limited as long as it is commonly used, but may use any one or more materials selected from among stainless steel, nickel, titanium, baked carbon and aluminum, and as necessary, a surface of the material may be further treated with carbon, nickel, titanium, silver or the like. In addition, the positive electrode current collector may have a form of a film, a sheet, foil, a net, a porous body, a foam, a non-woven fabric and the like, and the thickness is not particularly limited and may be set in a proper range considering mechanical strength of the positive electrode, productivity and battery capacity.

A method of forming the positive electrode active layer on the current collector is not particularly limited, and may use known coating methods such as a bar coating method, a screen coating method, a doctor blade method, a dip method, a reverse roll method, a direct roll method, a gravure method or an extrusion method. The amount of the positive electrode active layer coated on the current collector is not particularly limited as well, and may be adjusted considering a target final thickness of the positive electrode active layer. In addition, known processes required for preparing a positive electrode, for example, a rolling process, a drying process or the like may be performed before or after the process of forming the positive electrode active layer.

A negative electrode forming the lithium-sulfur secondary battery of the present invention includes a negative electrode current collector and a negative electrode active material layer formed on the negative electrode current collector, and the negative electrode active material layer includes a negative electrode active material, a binder and a conductor. As the negative electrode active material, materials capable of reversibly intercalating or deintercalating lithium ions (Li+), materials capable of reversibly forming a lithium-containing compound by reacting with lithium ions, lithium metal or lithium alloys may be used.

Examples of the material capable of reversibly intercalating or deintercalating lithium ions (Li+) may include crystalline carbon, amorphous carbon or mixtures thereof, examples of the material capable of reversibly forming a lithium-containing compound by reacting with lithium ions (Li+) may include tin oxide, titanium nitrate or silicon, and examples of the lithium alloy may include alloys of lithium (Li) and metals such as sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) or tin (Sn).

In addition, examples of the binder may include acryl-based polymers and the like, and those that may be commonly used as a binder in the art may be used without limit. As the negative electrode active material, the conductor and the current collector, those commonly used in the art may be used without particular limit.

An electrolyte liquid forming the lithium-sulfur secondary battery of the present invention includes a solvent and a lithium salt, and as necessary, may further include additives. As the solvent, common non-aqueous solvents performing a role of a medium through which ions involving in an electrochemical reaction of a battery migrate may be used without particular limit. Examples of the non-aqueous solvent may include carbonate-based solvents, ester-based solvents, ether-based solvents, ketone-based solvents, alcohol-based solvents, aprotic solvents and the like.

More specifically, examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) and the like, examples of the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, carprolactone and the like, and examples of the ether-based solvent may include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether and the like. In addition, examples of the ketone-based solvent may include cyclohexanone, examples of the alcohol-based solvent may include ethyl alcohol, isopropyl alcohol and the like, and examples of the aprotic solvents may include nitriles such as acetonitrile, amides such as dimethylformamide, dioxolanes such as 1,3-dioxolane (DOL), sulfolane and the like. Such a non-aqueous solvent may be used either alone or as a mixture of two or more, and when mixing two or more, the mixing ratio may be properly adjusted depending on target performance of the battery, and a solvent mixing 1,3-dioxolane and dimethoxyethane in a volume ratio of 1:1 may be included as an example.

A separator forming the lithium-sulfur secondary battery of the present invention has a function of physically separating electrodes, and common separators may be used without particular limit. However, those allowing lithium ion transfer between a positive electrode and a negative electrode while separating or insulating the positive electrode and the negative electrode, porous with porosity of 30% to 50%, and formed with non-conducting or insulating materials are preferred.

Examples of the separator may include porous polymer films prepared with polyolefin-based polymers such as an ethylene polymer, a propylene polymer, an ethylene/butene copolymer, an ethylene/hexene copolymer and an ethylene/methacrylate copolymer, non-woven fabrics made of high-melting glass fiber or the like, and the like, and the porous polymer film is more preferably used. As for other undescribed general various matters on the constitution of the lithium-sulfur secondary battery, common constitutions of a lithium-sulfur secondary battery may be applied.

Hereinafter, preferred examples are provided for illuminating the present invention, however, the following examples are for illustrative purposes only, and it will be obvious to those skilled in the art that various changes and modifications may be made within the category and technological ideas of the present invention, and such changes and modifications also fall within the scope of attached claims.

[Example 1] Charge of Lithium-Sulfur Secondary Battery Applying Charging Rate Differently for Each Section According to the following Table 1, a lithium-sulfur secondary battery using an electrolyte liquid including a lithium salt (1.0 M lithium bis(trifluoromethane sulfonyl) imide (LiTFSI)+1 wt % $LiNO_3$) and a solvent (DOL/DME in a volume ratio of 1:1) was completely charged by 2 step consecutive charge at a rate of 0.1 C (current rate)/0.1 C/0.2 C.

[Example 2] Charge of Lithium-Sulfur Secondary Battery Applying Charging Rate Differently for Each Section According to the following Table 1, charge of a lithium-sulfur secondary battery was completed in the same manner as in Example 1 except that the lithium-sulfur secondary battery went through 3 step consecutive charge at a rate of 0.1 C/0.2 C/0.1 C.

[Example 3] Charge of Lithium-Sulfur Secondary Battery Applying Charging Rate Differently for Each Section According to the following Table 1, charge of a lithium-sulfur secondary battery was completed in the same manner as in Example 1 except that the lithium-sulfur secondary battery went through 2 step consecutive charge at a rate of 0.1 C/0.2 C/0.2 C.

[Example 4] Charge of Lithium-Sulfur Secondary Battery Applying Charging Rate Differently for Each Section According to the following Table 1, charge of a lithium-sulfur secondary battery was completed in the same manner as in Example 1 except that the lithium-sulfur secondary battery went through 2 step consecutive charge at a rate of 0.2 C/0.1 C/0.1 C.

[Example 5] Charge of Lithium-Sulfur Secondary Battery Applying Charging Rate Differently for Each Section According to the following Table 1, charge of a lithium-sulfur secondary battery was completed in the same manner as in Example 1 except that the lithium-sulfur secondary battery went through 2 step consecutive charge at a rate of 0.2 C/0.2 C/0.1 C.

[Example 6] Charge of Lithium-Sulfur Secondary Battery Applying Charging Rate Differently for Each Section According to the following Table 1, charge of a lithium-sulfur secondary battery was completed in the same manner as in Example 1 except that the lithium-sulfur secondary battery went through 3 step consecutive charge at a rate of 0.2 C/0.1 C/0.2 C.

[Comparative Example 1] Common Charge of Lithium-Sulfur Secondary Battery

According to the following Table 1, charge of a lithium-sulfur secondary battery was completed in the same manner as in Example 1 except that the lithium-sulfur secondary battery was charged at the same rate of 0.1 C.

[Comparative Example 2] Common Charge of Lithium-Sulfur Secondary Battery

According to the following Table 1, charge of a lithium-sulfur secondary battery was completed in the same manner as in Example 1 except that the lithium-sulfur secondary battery was charged at the same rate of 0.2 C.

TABLE 1

| | Charging Rate for Each Step | Time Required for Complete Charge |
|---|---|---|
| Example 1 | 0.1 C/0.1 C/0.2 C | 8.7 h |
| Example 2 | 0.1 C/0.2 C/0.1 C | 6.8 h |
| Example 3 | 0.1 C/0.2 C/0.2 C | 5.1 h |
| Example 4 | 0.2 C/0.1 C/0.1 C | 9.2 h |
| Example 5 | 0.2 C/0.2 C/0.1 C | 6.5 h |
| Example 6 | 0.2 C/0.1 C/0.2 C | 8.3 h |
| Comparative Example 1 | 0.1 C/0.1 C/0.1 C | 9.8 h |
| Comparative Example 2 | 0.2 C/0.2 C/0.2 C | 4.8 h |

Figure 2:
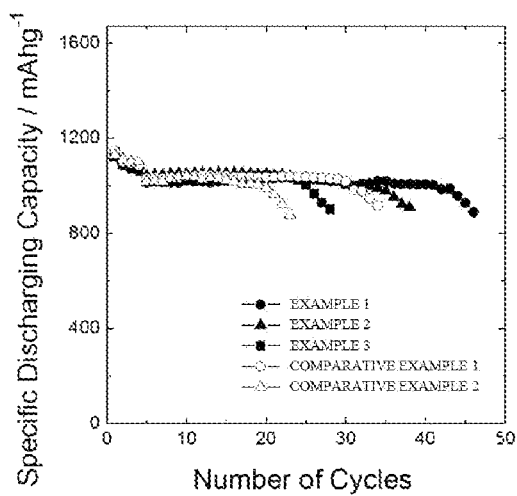
FIG. 2 is a graph comparing lifetime properties of a lithium-sulfur secondary battery according to one embodiment of the present invention and a lithium-sulfur secondary battery according to a comparative example.
Figure 2:
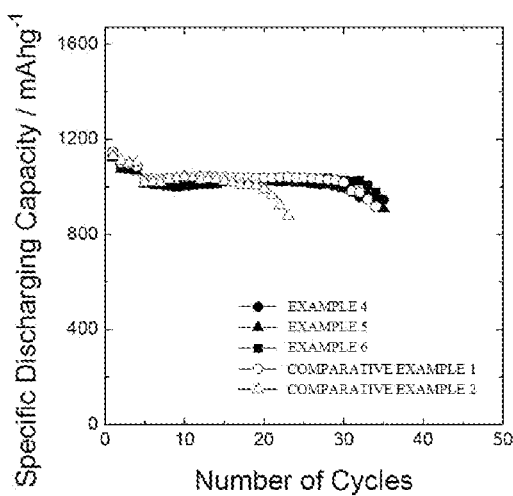
Figure 3:
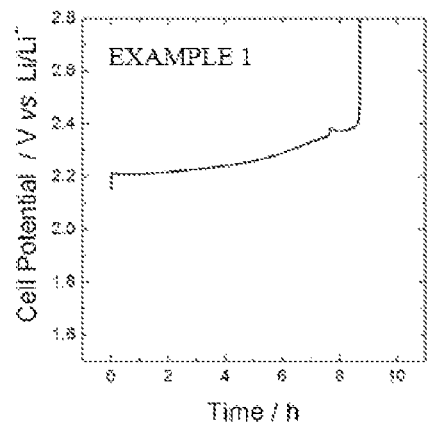
FIG. 3 is a graph presenting a charge profile of a lithium-sulfur secondary battery according to one embodiment of the present invention.
Figure 3:
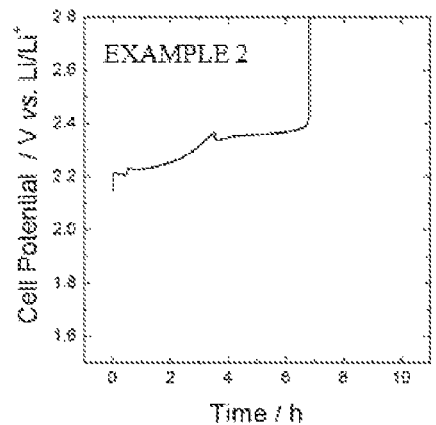
Figure 3:
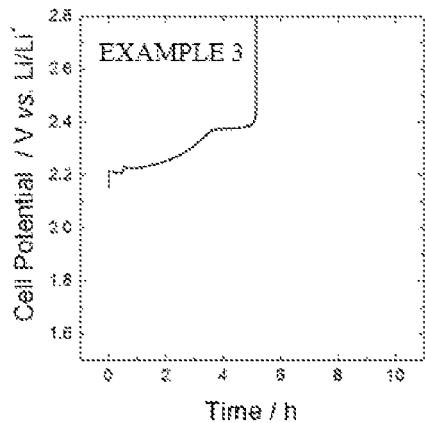
Figure 3:
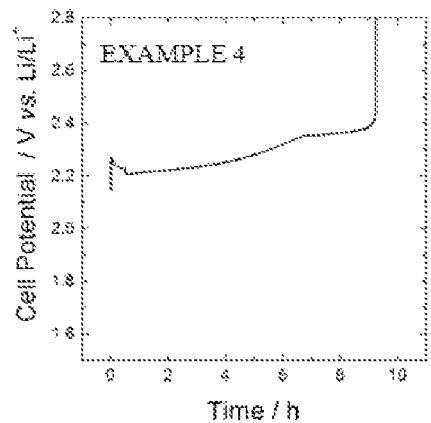
Figure 3:
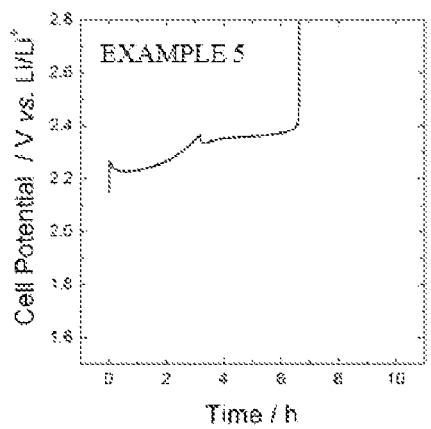
Figure 3:
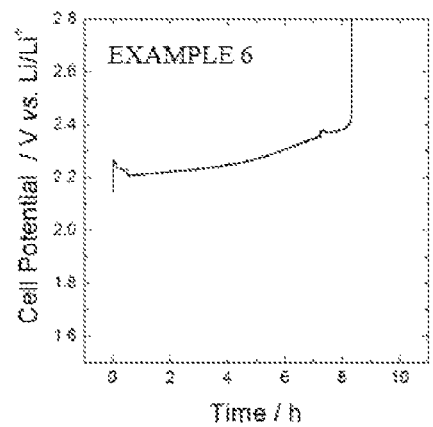
Figure 4:
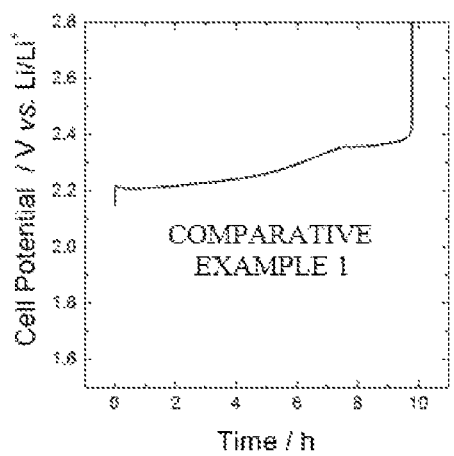
FIG. 4 is a graph presenting a charge profile of a lithium-sulfur secondary battery according to a comparative example of the present invention.
Figure 4:
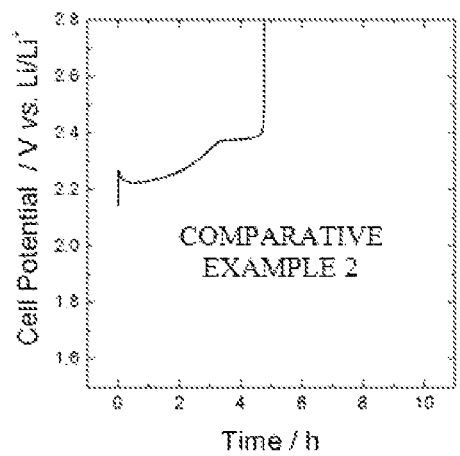

[Examples 1 to 6, Comparative Examples 1 and 2] Evaluation on Lifetime Property and Charging Rate of Lithium-Sulfur Secondary Battery Residual capacity resulted from the repetition of charge and discharge on each of the lithium-sulfur secondary batteries charged in Examples 1 to 6 and Comparative Examples 1 and 2 was identified, and a lifetime property of each of the lithium-sulfur secondary batteries was evaluated. FIG. 2 is a graph comparing lifetime properties of the lithium-sulfur secondary battery according to one embodiment of the present invention and the lithium-sulfur secondary battery according to the comparative example. FIG. 3 is a graph presenting a charge profile of the lithium-sulfur secondary battery according to one embodiment of the present invention, and A to F of FIG. 3 correspond to Examples 1 to 6, respectively. FIG. 4 is a graph presenting a charge profile of the lithium-sulfur secondary battery according to the comparative examples of the present invention, and A and B of FIG. 4 correspond to Comparative Examples 1 and 2, respectively.

First, in Example 1 consecutively charging the lithium-sulfur secondary battery in 2 steps at a rate of 0.1 C/0.1 C/0.2 C and in Example 2 consecutively charging in 3 steps at a rate of 0.1 C/0.2 C/0.1 C, it was identified that, as shown in A of FIG. 2 and Table 1, a lifetime property was improved, and charging time was faster by approximately 10% to 30% as well compared to Comparative Example 1 charging the lithium-sulfur secondary battery at the same rate of 0.1 C. In addition, Example 1 and 2 had a significantly enhanced lifetime property compared to Comparative Example 2.

In addition, Example 3 consecutively charging the lithium-sulfur secondary battery in 2 steps at a rate of 0.1 C/0.2 C/0.2 C had a significantly faster charging time compared to Comparative Example 1, also had an enhanced lifetime property compared to Comparative Example 2 charging at the same rate of 0.2 C, and also had a shortened charging time to a level close to Comparative Example 2. However, although the charging time was shortened, it was still not improved compared to the charging time of Comparative Example 2. However, since Comparative Example 2 has a problem of battery degeneration caused by a heterogeneous reaction, the present invention including Example 3 is meaningful when improving any one or more of a lifetime property and a charging rate compared to cases charging at the same rate as in Comparative Examples 1 and 2.

Subsequently, in Example 4 consecutively charging the lithium-sulfur secondary battery in 2 steps at a rate of 0.2 C/0.1 C/0.1 C, in Example 5 consecutively charging in 2 steps at a rate of 0.2 C/0.2 C/0.1 C, and in Example 6 consecutively charging in 3 steps at a rate of 0.2 C/0.1 C/0.2 C, it was identified that, as in B of FIG. 2 and Table 1, an equal or superior lifetime property was obtained and a charging time was also shorted by approximately 5% to 30% compared to Comparative Example 1. In addition, Examples 4 to 6 also had a significantly enhanced lifetime property compared to Comparative Example 2.

Particularly, in Examples 4 to 6 corresponding to high rate→low rate charge for each section, it was identified that, as shown in D to F of FIG. 3, high rate charge was achieved in a short period of time to the capacity corresponding to 70% to 80% of maximum battery capacity, which is almost equal to Comparative Example 2 (refer to B of FIG. 4) in which the time required for complete charge of the battery is the shortest.

In summary, the method for improving a lifetime property and a charging rate of a lithium-sulfur secondary battery according to the present invention satisfies both a long lifetime property when charging the lithium-sulfur secondary battery at the same rate of 0.1 C, and a charging time shortening property when charging the lithium-sulfur secondary battery at the same rate of 0.2 C, and in addition thereto, exhibits a synergistic effect of improving a lifetime property, and therefore, the present invention may be considered to have unique properties that have not been found previously.

The invention claimed is:

1. A method for charging a lithium-sulfur secondary battery, the method comprising:
   charging the lithium-sulfur secondary battery in a plurality of consecutive sections including:
   a first section at 0.1 C, a second section at 0.2 C and a third section at 0.1 C, with 0.2 C representing a high rate charging section and 0.1 C representing a low rate charging section,
   wherein the first section, the second section and the third section represent an entire charging profile of the lithium-sulfur secondary battery.

2. The method of claim 1, wherein the high rate charge is achieved to 70% to 80% of a maximum battery capacity.

3. The method of claim 2, wherein the high rate charging is performed for 180 minutes to 280 minutes.

4. The method of claim 1, wherein the secondary battery includes an electrolyte liquid including a lithium salt (1.0 M lithium bis(trifluoromethane sulfonyl)imide (LiTFSI)+1 wt % LiNO3) and a solvent (1,3-dioxolane (DOL)/methoxymethane (DME) in a volume ratio of 1:1).

5. The method of claim 4, wherein the high rate charge is achieved to 70% to 80% of a maximum battery capacity,
   wherein the high rate charging is performed for 180 minutes to 280 minutes, and wherein, in the charging process, sulfur is converted to lithium polysulfide by a reduction reaction, and the lithium polysulfide is completely reduced to produce lithium sulfur, where the lithium polysulfide is suppressed in the high rate charging section and an equalization reaction occurs in the low rate charging section(s).

6. The method of claim 1, wherein a first charging rate for the low rate charging section and a second charging rate for the high rate charging section are selected such that in the charging process, sulfur is converted to lithium polysulfide by a reduction reaction, and the lithium polysulfide is completely reduced to produce lithium sulfur, where the lithium polysulfide is suppressed in the high rate section and an equalization reaction occurs in the low rate section(s).

7. The method of claim 6, wherein the secondary battery includes an electrolyte liquid including a lithium salt (1.0 M lithium bis(trifluoromethane sulfonyl)imide (LiTFSI)+1 wt % $LiNO_3$) and a solvent (1,3-dioxolane (DOL)/methoxymethane (DME) in a volume ratio of 1:1).

8. The method of claim 7, wherein the high rate charge is achieved to 70% to 80% of a maximum battery capacity,
wherein the high rate charging is performed for 180 minutes to 280 minutes, and
wherein, in the charging process, sulfur is converted to lithium polysulfide by a reduction reaction, and the lithium polysulfide is completely reduced to produce lithium sulfur, where the lithium polysulfide is suppressed in the high rate charging section and an equalization reaction occurs in the low rate charging section(s).

* * * * *